May 12, 1964 D. S. HAYS ETAL 3,133,251

OVERLOAD PROTECTOR CIRCUIT FOR RADIO RECEIVERS

Filed May 15, 1961

INVENTOR.
DENNIS S. HAYS
BY EDWARD G. VOELZ
Mueller & Aichele
ATTYS.

United States Patent Office 3,133,251
Patented May 12, 1964

3,133,251

OVERLOAD PROTECTOR CIRCUIT FOR RADIO RECEIVERS

Dennis S. Hays, Berwyn, and Edward G. Voelz, Chicago, Ill., assignors to Motorola, Inc., Chicago, Ill., a corporation of Illinois Filed May 15, 1961, Ser. No. 109,956
4 Claims. (Cl. 325—362)

This invention relates to radio receivers, and more particularly to an overload protector circuit in a radio receiver to prevent distortion at high input signal levels.

Many present day automobile radio receivers operate directly from a 12 volt self-contained electrical system. In addition, it has recently become practical to build small inexpensive automobile radio receivers without a radio frequency amplifier stage. In receivers of this type, which must have high sensitivity for weak signal reception, overload distortion may occur at high input signal levels. Such distortion may take place when an automobile receiver is operated near a station so that a signal as high as 1 volt or more may be picked up at the receiver antenna. It will be understood that only moderate further amplification will produce a signal having an amplitude which is a very greaat percentage of the 12 volt B+ anode potential on the converter tube in the receiver. Under such conditions one or more tubes in the receiver could be overdriven to such an extent as to introduce nonlinearity and cause severe distortion. This problem is especially acute when, as is the case in the present invention, there is no radio frequency amplifier stage in the receiver which can be controlled to reduce the signal applied to the converter tube in response to strong received signals. In a receiver circuit wherein the converter plate is energized from the 12 volt source of the automobile electrical system, the signal to the converter must be relatively small or a resultant distortion will occur.

It is therefore an object of this invention to provide an improved radio receiver circuit for minimizing overload distortion in the presence of strong signals.

Another object of this invention is to provide an automobile radio receiver having an input circuit which is detuned in response to strong signals to reduce the signal applied to the first stage and thereby prevent overloading and distortion in the receiver.

Still another object of this invention is to provide a radio receiver circuit having no radio frequency amplifier stage, wherein the signal to the converter stage is clamped at a predetermined level in order to eliminate overload distortion.

A feature of the present invention is the provision of an automobile radio receiver with first and second tuned circuits connected between the antenna and the converter stage, and a diode connected across at least a part of the second tuned circuit to provide overload protection. The diode may detune the circuit when strong signals are received and/or provide clamping action which reduces the signal applied to the first tube stage. A reverse bias may be applied to the overload protecting diode to control the level at which the protecting action takes place.

Another feature of this invention is the provision of such an overload circuit wherein the diode is connected across the trimmer capacitor of the circuit so that the capacitor can be adjusted to compensate for individual irregularities in the diode used.

Figures 1, 2:
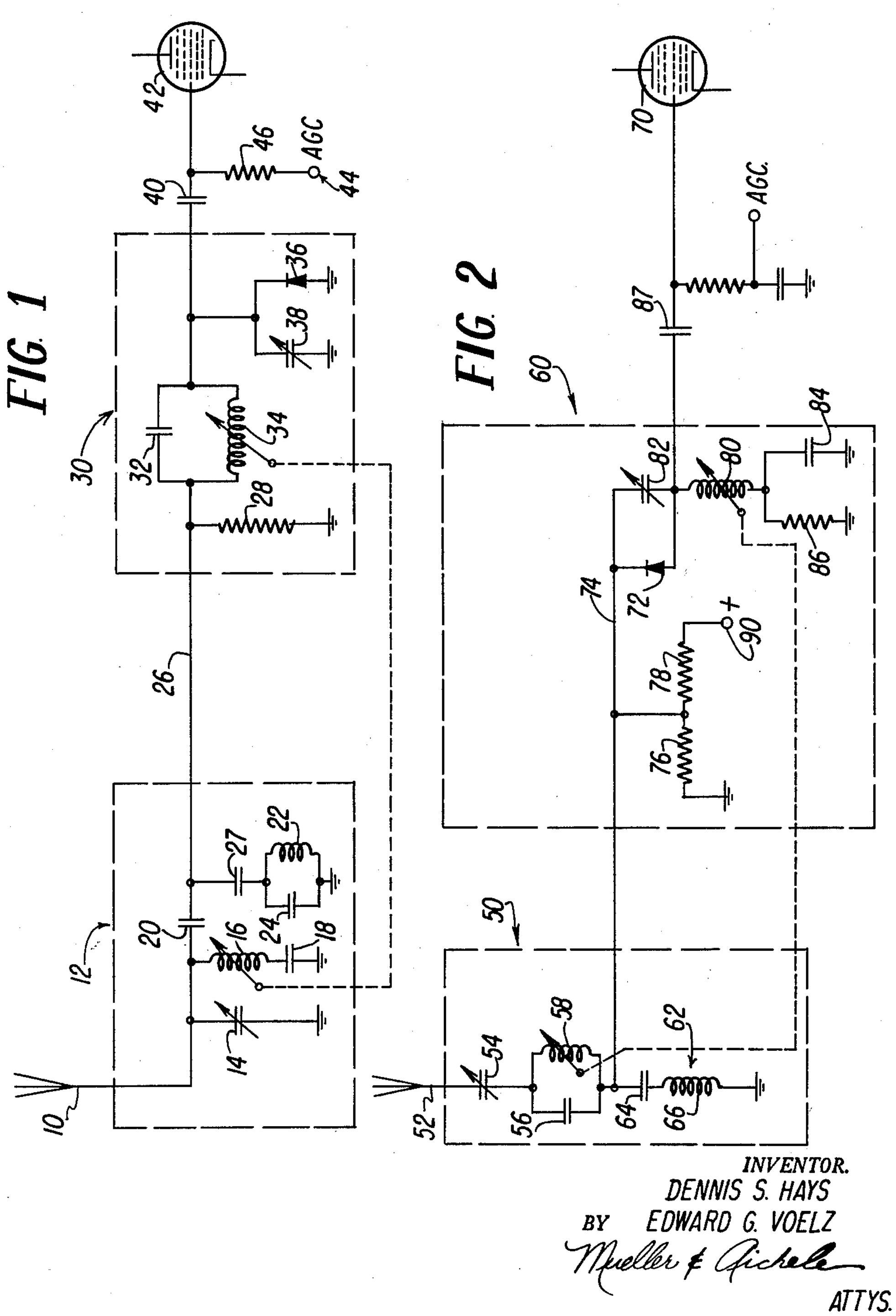
FIG. 1 is a schematic diagram of the circuit of the present invention.
FIG. 2 is a schematic diagram of a modified form of the present invention.

The present invention is embodied in an automobile radio receiver circuit which includes first and second tuned circuits between the antenna and the plate of the converter tube to apply the received signal thereto. Both the first and second tuned circuits are adjusted by the tuning control of the receiver so that signals of a selected frequency are received. A diode is connected across at lease a part of the second tuned circuit to provide protection from overload distortion at high input signal levels. The diode may be biased in the reverse direction so that when a signal which exceeds a predetermined level is applied, the diode conducts to detune the second tuned circuit. The second tuned circuit may be arranged so that the diode also acts to clamp the signal at a safe level to be fed to the converter tube. The protecting diode may be connected across the trimmer capacitor of the second tuned circuit so that this capacitor may be adjusted to compensate for individual differences in capacity from one diode to another.

Referring now particularly to FIG. 1, the schematic diagram shows an antenna 10, a first tuned circuit generally indicated by the reference numeral 12. The tuned circuit includes a trimmer capacitor 14 connected to ground potential and a variable inductor 16, and a capacitor 18 connected in series to ground. The circuit is tuned to the desired frequency by adjustment of inductor 16 by the receiver tuning control. The circuit further includes a coupling capacitor 20 and a trap circuit including capacitor 27 and inductor 22 and capacitor 24 which are parallel connected.

A second tuned circuit 30 connected by conductor 26 to the first tuned circuit 12 comprises a capacitor 32 and a variable inductor 34 which is mechanically connected to the receiver tuning control for operation with the variable inductor 16. The second tuned circuit includes a trimmer capacitor 38 connected from capacitor 32 and inductor 34 to ground. A diode 36 for providing overload protection is connected across trimmer capacitor 38. A resistor 28 connected to ground forms the D.C. return for the diode 36. A coupling capacitor 40 is coupled between the second tuned circuit 30 and the grid of the converter tube 42.

It will be noted that in the operation of the receiver, when the signal on antenna 10 is of the frequency to which the first and second tuned circuits are tuned, these circuits will operate to increase the signal by resonance action. When a strong signal is received, as for example when the apparatus is relatively near a transmitting station, this may apply a signal to the converter tube 42 which would overload this tube. In a receiver of this type, signal voltage at the input of the converter stage must not be a great percentage of the B+ energizing potential of the tube in order to provide operation of the tube in a linear region.

It is desirable to construct a receiver so that it has maximum sensitivity when it is desired to receive weak signals. In such a receiver some provisions must be made for reducing the high level signals which may be received at the antenna 10 to prevent distortion. At high signal levels, the AGC potential from point 44 will be applied through resistor 46 to the control grid of the tube for some reduction of the gain of this tube. However, this will not adequately reduce the signal applied to the grid of the converter tube. To accomplish this, diode 36, which may be of a vacuum tube or crystal form, is coupled in parallel with variable capacitor 38. At high signal levels, diode 36 will conduct to change its capacity, and this operates to detune the circuit including capacitors 32 and 38 and inductor 34. This decreases the signal provided from such circuit to the grid of tube 42.

Further, when the diode 36 is rendered conductive, its impedance decreases to provide a low impedance shunt path for the signal. This provides a clamping action which limits the level of the signal which is applied through capacitor 40 to the converter grid. Diode 36 is connected across trimmer capacitor 38 which can be adjusted to compensate for individual diode irregularities.

In FIG. 2 a radio receiver circuit is shown which illustrates a second embodiment of the invention. In FIG. 2 a first tuned circuit 50 and a second tuned circuit 60 are provided as in FIG. 1. The first tuned circuit 50 includes a trimmer capacitor 54 coupled to an antenna 52, and connected in series with capacitor 56 and tuning inductor 58 which are connected in parallel. An image trap generally indicated by the reference numeral 62 comprises a capacitor 64 and an inductor 66 connected in series to ground. This constitutes the first tuned circuit which is tuned to the frequency of the desired signal by control of the inductor 58.

The second tuned circuit 60 includes tuning inductor 80 connected in series with trimmer capacitor 82, and with capacitor 84 and resistor 86 which form an intermediate frequency trap. A protecting diode 72 is connected across trimer capacitor 82. Bias potential is applied to the diode 72 from resistors 76 and 78 which are connected to the potential supply 90, with the bias circuit being completed through inductor 80 and resistor 86. The signal from the second tuned circuit is fed through capacitor 87 to the grid of converter tube 70 as in the circuit of FIG. 1. The signal from the converter is applied to the remaining stages of the receiver in a known manner.

The signal received by the antenna 52 may be at such a high level that after having been transmitted through the first and second tuned circuits it will assume a potential which will overload the converter tube 70. Actually for converter tubes generally used with a 12-volt operating potential, the input signal must not exceed about .2 volt. It therefore becomes necessary to attenuate the signal prior to being fed to a converter 70. This is accomplished by action of diode 72 in the second tuned circuit 60. As stated above, the capacity of the diode changes as the signal increases to cause the diode to conduct. This detunes the second tuned circuit and attenuates the signal applied therefrom to the converter stage. This detuning action takes place only when the signal applied at the conductor 74 exceeds the bias applied thereto from source 90 across resistors 76 and 78.

From the foregoing it may be seen that this invention provides an improved circuit for a sensitive radio receiver which may at times be receiving strong signals. As described, the invention has particular utility in automobile receivers of the type operating directly from the auto electrical system providing potential in the order of 12 volts, and which do not include a radio frequency amplifier stage which may be controlled to reduce the signal. By utilizing the invention it is possible to construct the receiver to have maximum sensitivity for weak signals without encountering distortion and overloading from strong signals. By incorporating the overload protector circuit in the second of two tuned circuits between the antenna and the converter, the circuit is isolated from the antenna and does not decrease the sensitivity of the receiver for weak signals.

We claim:

1. In a radio receiver circuit the combination including an input terminal adapted to receive radio frequency signals, a first tuned circuit connected to said input terminal, a second tuned circuit coupled to said first tuned circuit, a converter stage coupled to said second tuned circuit, said first and said second tuned circuits including variable means for tuning the same to a predetermined frequency, said second tuned circuit including a trimmer capacitor, a diode connected across said trimmer capacitor, said trimmer capacitor cooperating with said diode to compensate for variations in the characteristics thereof, said diode conducting when the signal applied thereto by said second tuned circuit exceeds a predetermined value to alter the tuning of said second tuned circuit and thereby reduce the signal applied by said second tuned circuit to said converter stage.

2. In a radio receiver circuit the combination including an input terminal adapted to receive radio frequency signals, a first tuned circuit connected to said input terminal, a second tuned circuit coupled to said first tuned circuit, a converter stage coupled to said second tuned circuit, said first and said second tuned circuits including variable means for tuning the same to a predetermined frequency, said second tuned circuit including a trimmer capacitor, a diode connected across said trimmer capacitor, said trimmer capacitor cooperating with said diode to compensate for variations in the characteristics thereof, means applying a fixed bias to said diode to bias the same to be non-conductive until the signal applied to said diode by said second tuned circuit exceeds a predetermined level, said diode conducting when the signal in said second tuned circuit exceeds said predetermined value to detune said second tuned circuit and thereby reduce the signal applied by said second tuned circuit to said converter stage.

3. In a radio receiver circuit the combination including an input terminal adapted to receive radio frequency signals, a first tuned circuit connected to said input terminal, a second tuned circuit coupled to said first tuned circuit, a converter stage coupled to said second tuned circuit, said first and said second tuned circuits including variable means for tuning the same to a predetermined frequency, said second tuned circuit including a variable inductor and a trimmer capacitor connected in a series circuit between said first tuned circuit and a reference potential, means applying the signal from the junction of said variable inductor and said trimmer capacitor to said converter stage, and a diode connected across said trimmer capacitor, said trimmer capacitor cooperating with said diode to compensate for variations in the characteristics thereof, said diode being rendered conductive when the signal across said trimmer capacitor exceeds a predetermined value to detune said second tuned circuit and thereby reduce the signal applied to said converter stage.

4. In a radio receiver circuit the combination including an antenna adapted to receive radio frequency signals, a first tuned circuit connected to said antenna, a second tuned circuit coupled to said first tuned circuit, a converter stage coupled to said second tuned circuit, said first and said second tuned circuits including variable inductor means for tuning the same to a predetermined frequency, said second tuned circuit including a variable inductor and a trimmer capacitor connected in series between said first tuned circuit and a reference potential, means applying the signal from the junction of said variable inductor and said trimmer capacitor to said converter stage, and a diode connected across said trimmer capacitor, said trimmer capacitor cooperating with said diode to compensate for variations in the characteristics thereof, said diode being rendered conductive when the signal across said trimmer capacitor exceeds a predetermined value, said diode having one electrode thereof connected to said reference potential and operating to detune said second tuned circuit and to clamp the signal applied to said converter stage to thereby limit the same.

References Cited in the file of this patent

UNITED STATES PATENTS

| | | |
|---|---|---|
| 2,106,229 | Sinninger | Jan. 25, 1938 |
| 2,691,775 | Marcum | Oct. 12, 1954 |
| 2,799,775 | Florac | July 16, 1957 |
| 2,932,736 | Birkenes et al. | Apr. 12, 1960 |
| 2,947,859 | Macdonald | Aug. 2, 1960 |
| 2,967,236 | Freedman | Jan. 3, 1961 |
| 3,035,170 | Webster | May 15, 1962 |
| 3,061,785 | Battin | Oct. 30, 1962 |
| 3,067,394 | Zimmerman et al. | Dec. 4, 1962 |
| 3,072,849 | Firestone | Jan. 8, 1963 |

FOREIGN PATENTS

| | | |
|---|---|---|
| 414,187 | Great Britain | Aug. 2, 1934 |